United States Patent Office 3,663,521
Patented May 16, 1972

---

3,663,521
POLYMERS OF PERFLUOROBUTADIENE AND METHOD OF MANUFACTURE
James C. Fletcher, Administrator of the National Aeronautics and Space Administration, with respect to an invention by Madeline S. Toy, Orange, and James M. Newman, Huntington Beach, Calif.
No Drawing. Continuation-in-part of application Ser. No. 848,325, Aug. 7, 1969. This application May 19, 1971, Ser. No. 145,026
Int. Cl. C08f *3/20, 15/06*
U.S. Cl. 260—92.1
7 Claims

ABSTRACT OF THE DISCLOSURE

A polyperfluorobutadiene which is a copolymer of perfluoro-1,2- and 1,4-butadiene. One method of initiating the polymerization of the perfluorobutadiene utilizes diisopropyl peroxydicarbonate.

ORIGIN OF THE INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

CROSS-REFERENCE TO RELATED APPLICATION

This application is a continuation-in-part of U.S. application Ser. No. 848,325 filed Aug. 7, 1969, and now abandoned.

BACKGROUND OF THE INVENTION

(1) Field of the invention

This invention is in the field of new polymers and their method of manufacture. More particularly, the invention relates to a new polymer form of perfluorobutadiene and a novel method of making same.

(2) Description of the prior art

Prior to the herein invention, perfluorobutadiene had been polymerized by subjecting it to extremely high pressures on the order of 10,000 atm. Though good yields were obtained, it can be readily appreciated that operating at such high pressures placed severe limitations on the equipment utilized, as well as greatly increasing the hazards and costs of producing the polymer. In some instances, catalysts were also utilized. However, the high pressures were still maintained.

OBJECTS AND SUMMARY OF THE INVENTION

An object of this invention is to provide a new method of forming polyperfluorobutadiene under mild reaction conditions.

Another object of this invention is to provide a novel copolymer form of polyperfluorobutadiene.

Still another object of this invention is to provide a method of obtaining polyperfluorobutadiene in high yield.

The above and other objects of this invention are accomplished by initiating the polymerization of polyperfluorobutadiene with diisopropyl peroxydicarbonate as a catalyst therefor. The peroxydicarbonate is dissolved directly in the liquid perfluorobutadiene and the reaction is preferably carried out in a sealed vessel at the autogenous pressure of the polymerization. The degree of the polymerization and the yield of the product depend upon the reaction temperature and the ratio of the catalyst to the monomer. As will be shown, the yield of polymer will increase with an increasing percent of catalyst. However, at the higher amount of catalyst the polymer is of a lower molecular weight. Generally the reaction temperature is preferably about ambient. Though the material can be heated, the resulting product will tend to have a lower molecular weight. Further, the polymerization can be carried out in the presence of ultraviolet irradiation. This serves to reduce the time of polymerization, particularly at ambient temperatures, to obtain higher yields. Analysis of the resulting polyperfluorobutadiene indicates that it is a copolymer of perfluoro-1,2- and 1,4-butadiene, having the general formulas:

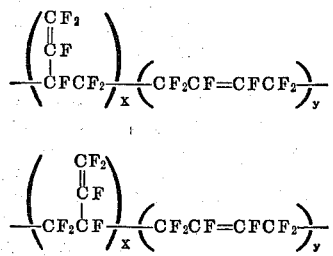

or

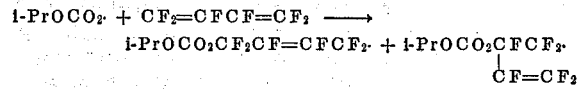

wherein $x$ and $y$ are positive integers where the ratio of $y$ to $x$ is from 2:1 to 6:1. It can be seen that the foregoing copolymer has the advantage of a side chain with terminal double bonds which are easily susceptible to cross linking reactions and graft copolymerizations.

DESCRIPTION OF THE PREFERRED EMBODIMENTS

It is believed that a free radical initiation mechanism is involved in the polymerization of perfluorobutadiene by diisopropyl peroxydicarbonate. At relatively low temperatures diisopropyl peroxydicarbonate is a source of free radicals. The first step is a homolysis of the oxygen-oxygen bond into isopropoxycarboxy radicals in accord with the following reaction:

(1)  $(i-PrOCO_2)_2 \rightleftarrows 2i-PrOCO_2$ after which a chain initiation can occur.

(2)
$$i\text{-}PrOCO_2 \cdot + CF_2 = CFCF = CF_2 \longrightarrow$$
$$i\text{-}PrOCO_2CF_2CF = CFCF_2 \cdot + i\text{-}PrOCO_2CFCF_2 \cdot$$
$$\underset{CF=CF_2}{|}$$

or a fraction of the radical of Equation 1 may undergo decarboxylation:

(3)  $i-PrOCO_2 \rightleftarrows i-PrO \cdot + CO_2$ followed by chain initiations.

One particular advantage in the utilization of the diisopropyl peroxydicarbonate catalyst is that it is miscible with the perfluorobutadiene monomer. It is believed that this miscibility particularly leads to the attainment of the high yield of polymer product. In carrying out the reaction, the amount of catalyst is not critical. Generally at least 0.10 weight percent is required, however, in order to obtain a polymerization. As will be shown, there is a point of catalyst percent where the molecular weight of the end polymer is maximized. Above this percentage of catalyst, a decrease in polymer weight is obtained. The reaction is preferably carried out in a pressure bottle which has been chilled by ice bath or the like since the catalyst decomposes at 5° C. Thus, the solid catalyst is placed into the ice-bath chilled pressure vessel which is attached to a vacuum line and evacuated. The chilled and evacuated vessel is then cooled in liquid nitrogen or Dry Ice acetone bath and perfluorobutadiene is condnesed into the vessel.

The bottle is then sealed or closed off from the vacuum line and the materials are continually mixed during the course of reaction. The closed bottle can be heated to about 50° C. during the reaction period, which can last from 24 hours up to several weeks. Satisfactory results are obtainable, however, at ambient temperature and heating thus is not necessarily required. However, at ambient conditions the yield is somewhat lower. Higher yields at ambient temperature can be obtained, however, by subjecting the reaction mixture to ultraviolet irradiation. This further serves to increase the rate of polymerization so that a good yield is obtained in a shorter period of time. At 50° C. the liquid, mostly unreacted monomer, remains colorless and solid polymer remains white. When heated above 50° C., such as 75° C., the liquid turns yellow and the solid polymer turns slightly yellow. The time of reaction required to obtain a product can be determined by a trial and error method for each set of conditions for the polymerization. One merely tests the resultant product at various lengths of time to determine the degree of reaction has transpired.

The use of diisopropyl peroxydicarbonate under the above reaction conditions, particularly provides good yield of the copolymer of perfluoro-1,2 and 1,4-butadiene within a relatively short reaction period, which can be further shortened by the use of ultraviolet irradiation. The same novel product can be obtained through the use of bis(trifluoromethyl) peroxide, benzoyl peroxide and di-tert-butyl peroxide as catalysts under similar reaction conditions as set forth herein. These additional catalysts and their use to polymerized perfluorobutadiene is disclosed in copending application Ser. No. 848,351 filed Aug. 7, 1969. Though good yields are obtainable using the additional three catalysts, the reaction periods required are greater than when using the herein catalyst alone. Thus, it is preferred to particularly use ultraviolet irradiation to aid in shortening the reaction periods to obtain good yield as further set forth in the above mentioned copending application.

The utilization of the aforegoing catalyst produces perfluorobutadiene having a relatively high molecular weights of up to, for example, 17,000. The copolymer of perfluoro-1,2- and 1,4-butadiene has also been formed without the use of any catalyst. However, the molecular weight of the product is quite low. For example, the copolymer has been produced by utilizing gamma irradiation alone at ambient conditions for a period of five days. The resulting polymer had a molecular weight of 1,000 to 4,000. The use, however, of the gamma irradiation is found, however, to provide a relatively high concentration of the 1,2 butadiene where the ratio of $y$ to $x$ in the general formula given is from 2:1, to 3:1. One the other hand, use of the above described catalyst provides for a lesser amount of the 1,2 wherein the ratio of $y$ to $x$ in the formula given above is toward the high end of the scale, namely, 4:1, to 6:1. In addition to gamma irradiation, ultraviolet light can be utilized over periods varying from a few days to several weeks. The utilization, however, of the ultraviolet irradiation not only provides for relatively low molecular weight products, around 2,000 to 5,000, which might be desirable if such is sounght, but has the drawback of producing the polymer in low yields on the order of 3 to 5%.

Thus, it can be seen from the above description, that one can control the amount of side chains present, or in other words, the 1,2-butadiene by selecting the method of polymerization. There appears to be less of the 1,2 material present when utilizing catalysts then when using either gamma or ultraviolet irradiation. If one wishes to have a polymer that had the 1,2-butadiene in an amount following between the higher proportion found utilizing the radiation and the lesser amount from the catalyst, one could mix materials formed by both processes. This, in fact, will be seen in one of the following examples.

It is believed that the invention will be better understood from the following detailed examples:

Example I.—Into an ice chilled 125 mm. pressure bottle was placed 3.4 grams of solid diisopropyl peroxydicarbonate. The pressure bottle was then attached to a vacuum line and evacuated while the bottle was cooling to a liquid nitrogen temperature. The bottle was then charged with 41.7 grams of perfluorobutadiene. Thus, the amount of catalyst was equivalent to 7.4 weight percent. The bottle was then sealed and heated with agitation under autogenous pressure at 50° C. for two weeks. White polymer precipitated in the course of the reaction. At the end of the two week period, the pressure bottle was chilled to liquid nitrogen temperature to be opened, then attached to the vacuum line being evacuated, followed by warming to ambient to discharge the unreacted monomer under reduced pressure. At ambient temperature, the catalyst decomposes to gaseous products which are easily removed by evacuation. The white homopolymer resulting was then evacuated and dried at 50° C. to give 25.2 grams of white wax. This is equivalent to a 60% conversion to a polymer. The wax had a melting point between 73 and 76° C. and a molecular weight of 1580. The infrared spectrum of the homopolymer showed a copolymer of perfluoro-1,2- and 1,4-butadiene as evidenced by peaks at 5.6 microns indicating the perfluorovinyl group, $$(-CH=CF_2)$$

and at 5.8 microns indicating internal 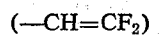 groups.

Example II.—The procedure in Example I was repeated except that the amount of catalyst was reduced to 1.9 weight percent, and the polymerization temperature was decreased to ambient. Under these conditions only 16% conversion to a polymer product was obtained. The polymer, however, was a white and hard elastomer having a melting point between 90° and 110° C. and an average molecular weight of about 7070. The infrared spectrum of the homopolymer obtained once again indicated the copolymer of perfluoro-1,2- and 1,4-butadiene.

Example III.—The procedure of Example II was repeated. However, the amount of catalyst was increased to 2.7 weight percent. A white hard elastomer was obtained after the two weeks of reaction. The yield was considerably improved, to 31%. The product had a melting point between 80° and 90° C. and a molecular weight of 5690. The infrared spectrum indicated a copolymer perfluoro-1,2- and 1,4-butadiene.

Thus it can be seen from the above examples that the product with the highest molecular weight was obtained with the smallest amount of catalyst. However, a penalty was paid in that the yield was quite low. Alternatively, the product with the highest yield utilized the most catalyst, yet this product as set forth in Example I was a light wax. The high yield of wax is particularly desirable.

The polyperfluorobutadiene formed in accord with the method of the invention has good chemical resistance and can be used where a hard elastomer is desirable. Further, the polymer can serve as a prepolymer to form high molecular weight material that has excellent temperature and other properties.

Example IV.—In this example, a mixed polyperfluorobutadiene was utilized. The mixed product contained 50% of polymerized perfluorobutadiene which was made from reacting perfluorobutadiene with bis-trifluoromethyl peroxide as a catalyst. The catalyst comprised 5 weight percent of the mixture. The mixture was stirred for a period of two days while subjecting it to ultraviolet irradiation from a low pressure mercury discharge source. The remaining 50% of the starting mixed polymer utilized was a polyperfluorobutadiene resulting from subjecting perfluorobutadiene to ultraviolet irradiation without the presence of the catalyst for a 12 day period wherein the perfluorobutadiene was constantly stirred. The starting mixture of the two polyperfluorobutadienes had a melting point between 118 and violet irradiation without the presence of the catalyst for a 12 day period wherein the perfluorobutadiene was constantly stirred. The starting mixture of the two polyperfluorobutadienes had a melting point between 118 and 145° C. The intrinsic viscosity as determined in hexafluorobenzene at 30.1° C. was 0.021, and it had an average molecular weight of 7,200. The polyperfluorobutadiene was suspended in Freon 113. The suspension was in a reaction vessel which was placed in an ice bath. A mixture of 50% of $OF_2$ and 50% helium gas was bubbled through the suspension over a period of 17 hours. The initial pressure in the reaction vessel was 1⅓ atmospheres. Over the 17 hour period, the ice bath melted and the temperature in the vessel rose to 13° C. A colorless gum product resulted which had a melting point between 98 and 136° C. An IR spectra analysis of the gum indicated an absorbance at 5.3μ indicating the presence of

or acyl fluoride groups. The aforegoing example thus produced a polyperfluorobutadiene having acyl fluoride groupings in accord with the following general structure:

The aforedescribed method of forming the acyl fluoride containing polyperfluorobutadiene is described in further detail in copending application Ser. No. 45,549 filed June 11, 1970 of the same inventor.

Example V.—The methyl ester of carboxyl polyperfluorobutadiene having the formula

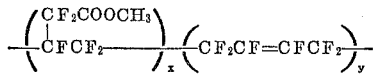

was synthesized by reacting a Freon 113 suspension of acyl fluoride polyperfluorobutadiene made from Example IV, with a stoichiometric excess of three to four times the amount required of methanol at ambient temperature. Distilled water was added and followed by a very slow dropwise addition of triethylamine until the stirred suspension became neutral. The Freon 113 layer was repeatedly washed with distilled water before evaporation to give an almost quantitative yield of the methyl ester polymer. It was found that in the resulting polymer $x=1$ and $y=3$. This is confirmed by elemental analysis. The calculated elemental analysis for $C_{17}H_3F_{23}O_2$ is (percent): C, 30.19; H, 0.44; F, 64.63. The analysis of the formed compound was (percent): C, 29.43; H, 0.21 and F, 64.62.

What is claimed is:
1. A copolymer of perfluoro-1,2- and 1,4-butadiene having the general formulae:

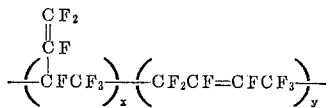

or

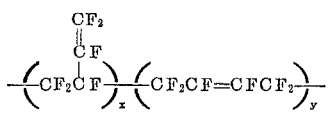

wherein $x$ and $y$ are positive integers such that the ratio of $y$ to $x$ is from 2:1 to 6:1.

2. A method of forming polyperfluorobutadiene comprising:
mixing perfluorobutadiene with an amount of diisopropyl peroxydicarbonate sufficient to achieve polymerization of perfluorobutadiene,
and allowing the two materials to remain in contact until a resulting polymer is formed.

3. The method of claim 2 comprising: adding at least 0.10 weight percent of said diisopropyl peroxydicarbonate.

4. The method of claim 2 comprising: maintaining said materials at ambient temperature during the polymerization.

5. The method of claim 2 comprising: warming the materials to about 50° C. during the polymerization.

6. The method of claim 2 further comprising:
placing said two materials in a vacuum sealed pressure vessel,
and allowing the polymerization to proceed in said vessel at the autogenous pressure of the reaction.

7. The method of claim 6 further comprising: pre-chilling said vessel prior to admitting said diisopropyl peroxydicarbonate thereto.

References Cited
UNITED STATES PATENTS

| | | | |
|---|---|---|---|
| 2,774,751 | 12/1956 | Passino et al. | 260—92.1 |
| 2,775,618 | 12/1956 | Dittman et al. | 260—92.1 |
| 2,888,446 | 5/1959 | Herbst et al. | 260—92.1 |
| 2,970,988 | 2/1961 | Lo | 260—92.1 |
| 3,475,396 | 10/1969 | McCain et al. | 260—92.1 |

HARRY WONG, JR., Primary Examiner

U.S. Cl. X.R.
204—159.22, 159.23; 260—87.5